Nov. 5, 1929.   C. F. JEFFRIES   1,734,908
METHOD OF MACHINING COMPRESSION RECESSES IN CYLINDER HEADS
Filed April 13, 1926   3 Sheets-Sheet 3
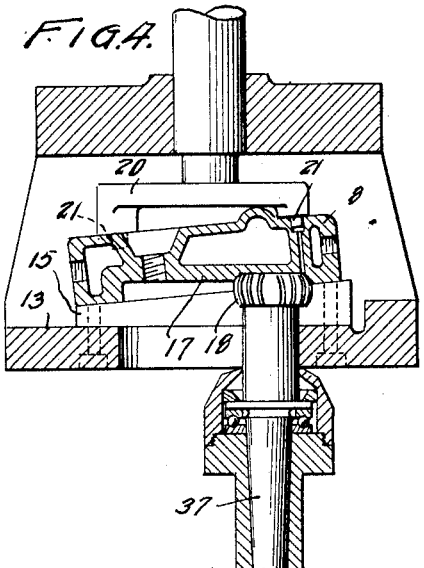
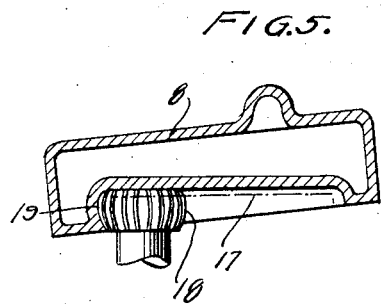
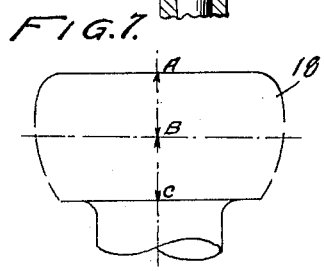
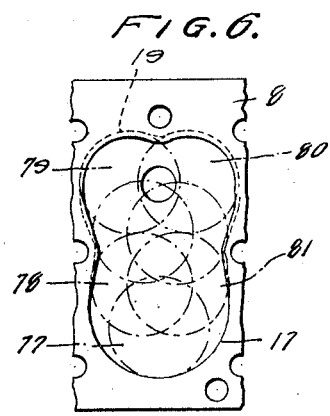
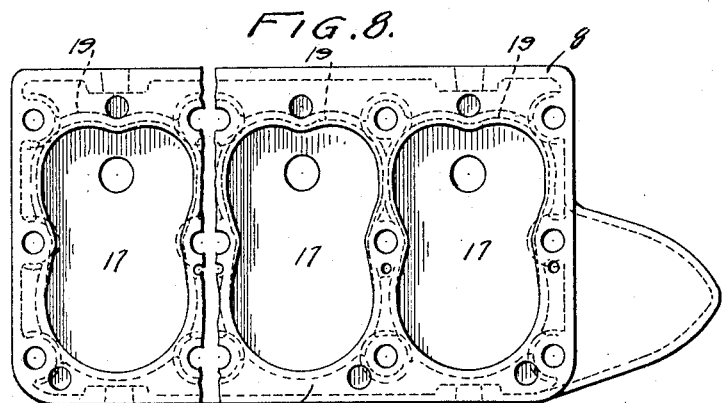
Inventor
Carl F. Jeffries
By Mauro, Cameron, Lewis & Kirkam
Attorneys Patented Nov. 5, 1929

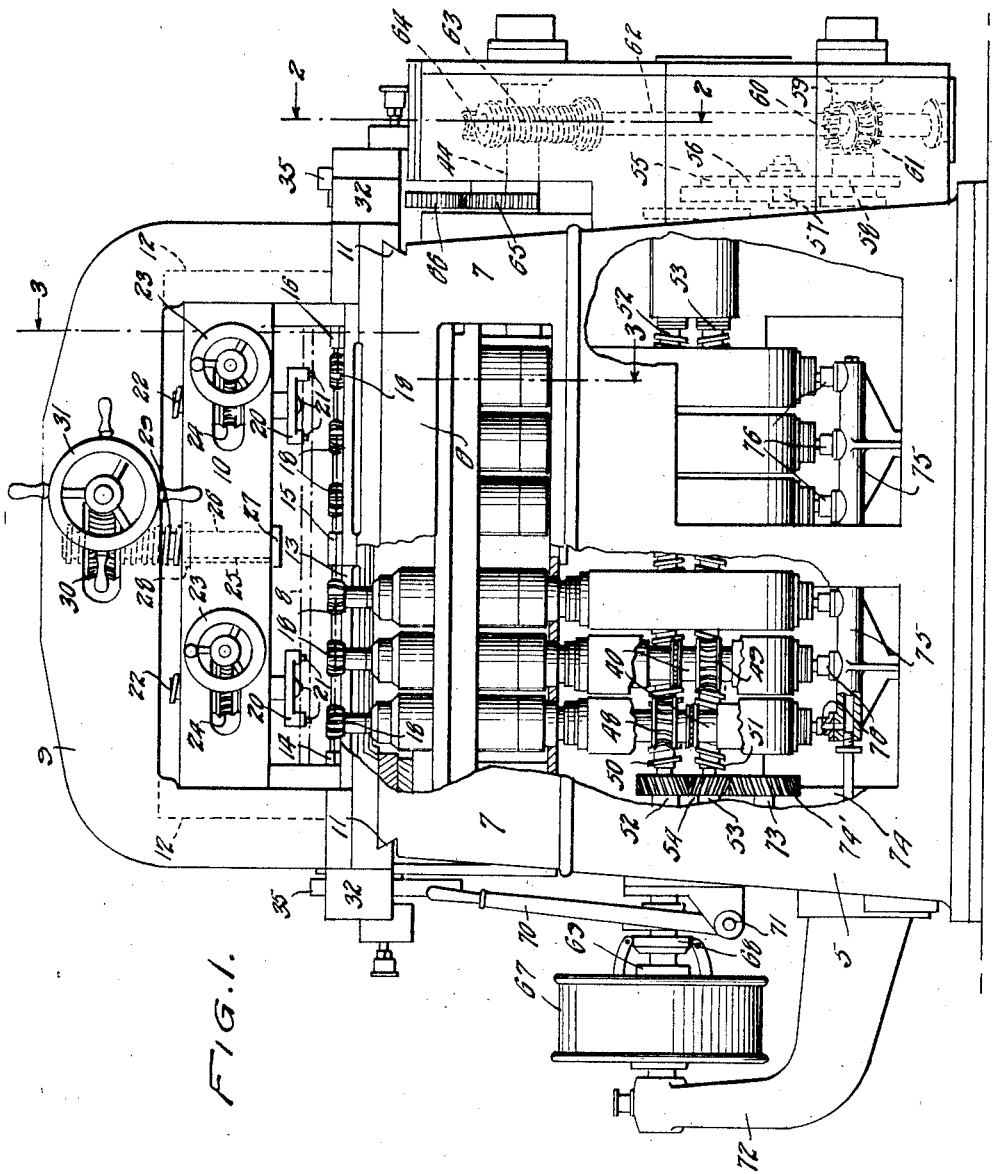

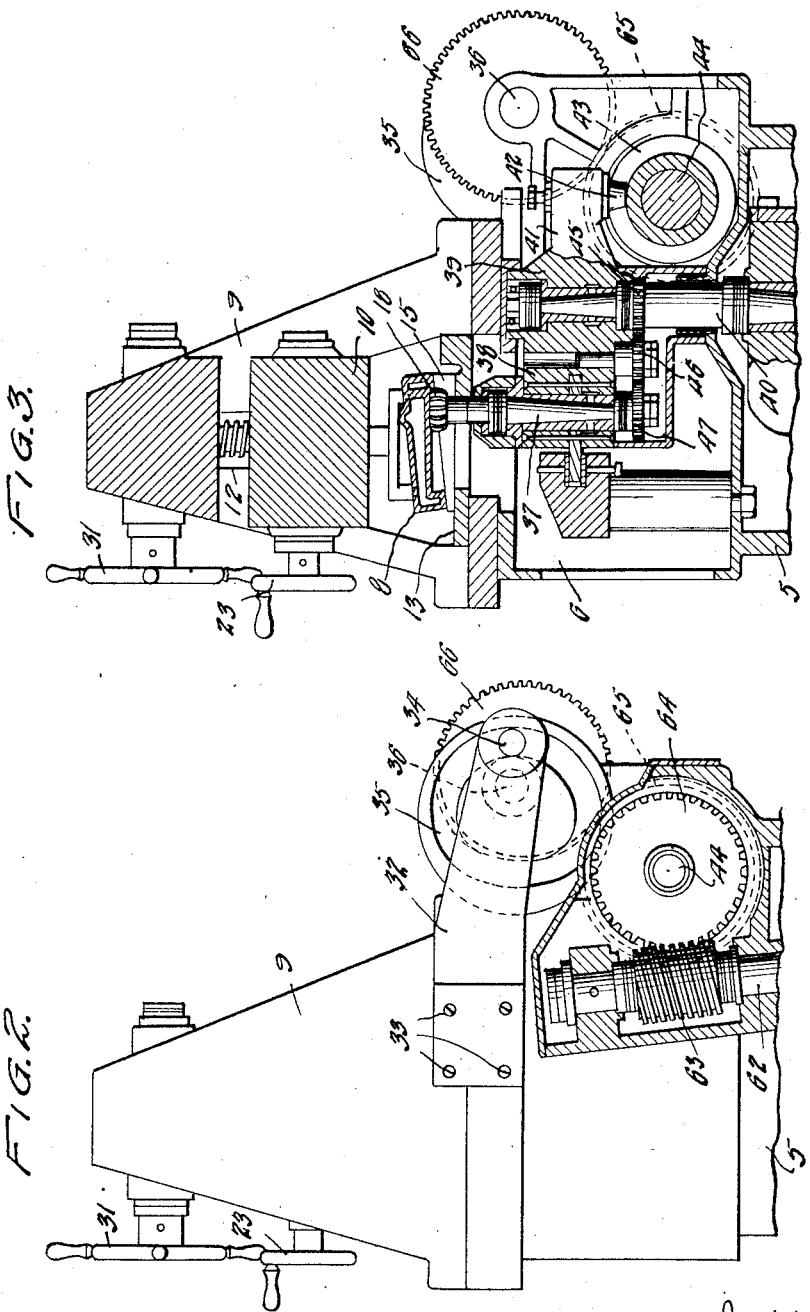

1,734,908

UNITED STATES PATENT OFFICE

CARL F. JEFFRIES, OF ROYAL OAK, MICHIGAN, ASSIGNOR TO PACKARD MOTOR CAR COMPANY, OF DETROIT, MICHIGAN, A CORPORATION OF MICHIGAN

METHOD OF MACHINING COMPRESSION RECESSES IN CYLINDER HEADS

Application filed April 13, 1926. Serial No. 101,803.

This invention relates to a method for machining cylinder heads and more particularly to a method for machining the walls or surfaces of compression recesses formed in cylinder heads for hydrocarbon motors.

It has heretofore been proposed to cast cylinder heads with compression recesses therein of tapered depth, but the cylinder heads thus formed have proved unsatisfactory by reason of irregularities in the contours of the compression recesses and the resulting variation in compression of the several cylinders of the hydrocarbon motor. It has further been proposed to machine the walls or surfaces of the tapered recesses so as to obtain uniformity of profile of the same and uniform compression in the several cylinders of the motor. The manner in which these compression recesses have heretofore been machined has not been adapted to provide a type of tapered compression recess which is undercut at its deeper portion around the valves and which has certain recognized advantages over the tapered compression recesses heretofore employed.

The principal objects of this invention are to provide a method for machining cylinder heads which obtains all of the advantages of machining the walls of tapered compression recesses and at the same time enables said walls to be undercut at the deeper portions of the recesses; which insures that the mill or cutting tool employed will be engaged with and disengaged from the wall of the tapered recess at the shallower portion thereof; which enables the recess wall to be cut in a closed path beginning and ending at the shallower part of the recess; which enables the use of a rose-end mill or cutter to machine the wall of the tapered recess and undercut it at the deeper portion thereof; and which is inexpensive, expeditious, and effective in the machining of tapered compression recesses undercut at the deeper portions thereof.

In order to more clearly understand this invention, reference may be had to the accompanying drawings which illustrate one manner in which the inventive idea may be carried out, and wherein—

Fig. 1 is a front elevation of one form of mechanism for carrying out the present invention and having parts broken away for purposes of clearer illustration;

Fig. 2 is a sectional elevation on the line 2—2 of Fig. 1;

Fig. 3 is a transverse section on the line 3—3 of Fig. 1;

Fig. 4 is an enlarged sectional view showing the relation of the tool and work at the beginning of the cutting operations;

Fig. 5 is a view similar to Fig. 4, with parts omitted, showing the relation of the tool and work during the undercutting operation;

Fig. 6 is a diagrammatic view illustrating the path cut by the tool from the initial to the final cutting positions;

Fig. 7 is an enlarged side elevation of one of the cutting tools; and

Fig. 8 is a bottom plan view of a cylinder head showing compression recesses therein machined in accordance with the present method.

Referring to the drawings, wherein like reference numerals designate like parts throughout the several views, the mechanism therein shown is mounted on a hollow base 5 provided at the upper part thereof with a table 6, the supports 7, 7 for which are bolted or otherwise suitably secured to the hollow base 5. The work holder for the cylinder head 8, preferably comprises an outer rectangular frame 9, and an inner rectangular frame 10 on which the cylinder head 8 is supported during the machining operations thereon. The outer frame 9 is slidably mounted on the table 6 for reciprocating movement transversely thereof, as by dovetail ways 11, 11, and the frame 10 is slidably mounted on the frame 9 for vertical reciprocating movement, as by ways 12, 12 thereon in which the ends of the frame 10 are slidably guided. The open bottom member 13 of the inner frame 10 carries spaced rests or supports 14, 15 and 16, having supporting surfaces arranged at an angle to the longitudinal axes of the cutting tools and on which the cylinder head 8 is mounted with the compression recesses thereof facing said tools so that the wall 17 of each compression recess is disposed in a plane substantially at right angles to the axis of one of the cutting tools 18, 18.

In carrying out the present invention, the cutting tools 18, 18 may comprise rose-end mills each having side cutting edges curved in an axial direction and top cutting edges, the whole comprising an advanced cutting portion A—B (Fig. 7), the axial dimension of which preferably corresponds substantially to the minimum depth of the tapered compression recess, and a full cutting portion A—C, the axial dimension of which is greater than that of the advanced cutting portion A—B and preferably corresponds substantially to the maximum depth of the tapered recess. In the operation of the machine, the work and the cutting tool are first moved relatively one toward the other to engage the advanced cutting portion of the latter in the shallower part of a tapered compression recess, the work and the tool thereafter being reciprocated relatively so as to machine the recess wall in a closed path beginning and ending at the shallower part of the recess and including the forming of an undercut wall portion 19 (Figs. 5, 6 and 8) in the deeper part of the recess by the full cutting portion A—C of the tool. To effect these operations, the following instrumentalities may be employed.

The cylinder head 8 is preferably clamped on the inclined supports 14, 15 and 16 to insure against displacement of the cylinder head while the tools are machining the tapered walls of the compression recesses. Any suitable means may be employed for clamping the cylinder head on the inclined support, but as herein shown, said means preferably comprises a plurality of clamping heads 20, 20, each provided with one or more pins 21, 21 adapted to engage in depressions or recesses in the top of the cylinder head 8. The clamping heads 20, 20 are secured on the lower ends of screw shafts 22, 22 extending through suitable openings in the upper part of the frame 10 and adapted to be adjusted vertically in order to engage the clamping heads with or disengage the same from the cylinder head 8. Vertical movement of the screw shafts 22, 22 to engage the clamping heads 20, 20 with the work is obtained through the medium of hand-wheels 23, 23 journaled in suitable bearings on the frame 10 and geared with worm gears 24, 24 also journaled on the frame 10 and through which the shafts 22, 22 are threaded.

The frame 10 has secured against rotation therein, as by a key 25, a shaft 26 having collars 27 and 28 fixed thereon so as to prevent longitudinal displacement of the shaft from the frame 10. The upper part of the shaft 26 is threaded, as at 29, into a wormwheel 30 which is geared to and rotated by a hand-wheel 31 journaled in suitable bearings on the outer frame 9.

In order to initially engage the rose-end mills 18, 18 with the work so that the advanced cutting portions of the former will enter the tapered compression recesses at the shallower parts thereof, the frame 9 is run forward and the cylinder head is clamped on the inclined supports 14, 15 and 16. The frame 10 is then lowered by the hand-wheel 31 until the shallower parts of the compression recesses are engaged with the advanced cutting portions of the mills 18, 18 in the shallower parts of the said recesses, as shown in Figs. 3 and 4, and the work and the tools may thereafter be reciprocated relatively so as to machine the recess walls and undercut the same at the deeper parts of the recesses.

The mechanism for reciprocating the work and the tools relatively to perform the machining and undercutting operaton is preferably constituted by the following devices. The frame 9 is provided at the ends thereof with arms 32, 32 bolted or otherwise suitably secured to the same at 33, 33 and carrying on their rearwardly extending ends rollers one of which is indicated at 34 (Fig. 2). These rollers engage in cams 35, 35 fixed on the opposite ends of a driven shaft 36 which, when rotated, causes the cams and rollers to impart translatory reciprocating movement to the frame 9 transversely of the machine and thereby reciprocate the cylinder head 8 in a rectilinear path during the machining of the compression recesses.

The rose-end mills 18, 18 are preferably reciprocated across the path of travel of the frame 9 so as to machine the tapered compression recesses in closed paths substantially following the marginal edges of the recesses, and, as above stated, beginning and ending at the shallower parts of the recesses or the ends thereof opposite the undercut wall portions 19, 19 formed by the major cutting portions of the mills 18, 18. The mechanism for driving the tools and reciprocating the same is substantially identical for each tool and it is therefore only necessary to describe one of them. Each tool or mill 18 is fixed on a holder 37 rotataly mounted on one arm 38 of an oscillating support 39 pivoted on the upper end of a driving spindle 40 journaled in suitable bearings in the machine framework. The other end 41 of the support 39 carries a pin 42 which engages in a cam 43 fixed on a cam shaft 44 extending longitudinally of the machine and journaled in suitable bearings thereon. When the cam shaft 44 is rotated, the cam 33 causes the support 39 to reciprocate or oscillate back and forth so that the tool 18 substantially follows the marginal contour of the tapered compression recess and at the same time machines the recess wall and undercuts the same at the deeper part of the recess. It will of course be understood that the shape of the cam is such as produces the aforesaid movement of the support 39, and that a series of these cams are provided on the shaft 44, one for each of the supports 39. During reciprocating movement of the support 39, the tool holder 37 is rotated by a gear 45 fixed on the rotatable driving spindle 40 and meshing with an idler gear 46 journaled on the arm 38 of the support 39. This idler gear meshes with a gear 47 fixed on the lower end of the rotatably mounted tool holder 37, and it will thus be observed that the spindle 40 serves not only as a pivot for the support 39 but also, through the medium of gears 45, 46 and 47, as the driving means for the tool or rose-end mill 18.

The spindles 40, 40 are preferably driven in opposite directions through the medium of worm gears 48 and 49 fixed on the lower end of each adjacent pair of spindles 40, 40 and meshing with oppositely threaded worms 50 and 51 secured to or formed on driven shafts 52 and 53. The shafts 52 and 53 extend longitudinally of the machine, as clearly shown in Fig. 1, and are journaled one above the other in suitable bearings on the machine framework. The shaft 53 is driven from the shaft 52 by a gear 54 fixed on the last-named shaft and meshing with a gear 55 keyed or otherwise rigidly secured on the shaft 53.

The cam shaft 44 is driven through the medium of suitable gearing, from the shaft 53, and as herein shown said gearing preferably includes the following elements. Fixed on one end of the shaft 53 is a gear 55 which meshes with an idler gear 56 journaled on a slotted pivoted arm 57 carried by the shaft 53. This idler gear 56 meshes with a gear 58 fixed on a shaft 59 journaled in suitable bearings on the machine framework. The shaft 59 has fixed thereon a worm 60 which meshes with a worm wheel 61 fixed on the lower end of a substantially vertical shaft 62 which is also journaled in suitable bearings on the framework of the machine. The upper end of the shaft 62 carries a worm 63 which meshes with a worm wheel 64 fixed on the adjacent end of the cam shaft 44 and by which the latter is driven (Fig. 1).

The shaft 36 and the cams 35 carried thereby, are preferably driven from the cam shaft 44 which for this purpose has fixed on the opposite ends thereof a pair of spur gears one of which is indicated at 65 (Figs. 2 and 3). These spur gears mesh with a similar pair of gears fixed on the opposite ends of the shaft 36 and one of which is indicated at 66. From the foregoing it will appear that the shaft 52 constitutes the main power shaft for operating the various driven instrumentalities carried by the machine framework and the shaft 52 is therefore preferably extended beyond one end of the machine and has loosely mounted thereon a pulley 67 driven by a belt (not shown) from any suitable source of power. The pulley 67, when connected with the shaft 62, serves to drive the latter and the connection between the pulley and said shaft is made by the usual clutch consisting of driving and driven elements 68 and 69 which may be moved into and out of engagement by the usual clutch operating lever 70 pivotally mounted as at 71 on the adjacent end of the machine. The extended portion of the shaft 52 is preferably journaled in a suitable bearing on the upper end of an arm 72 bolted or otherwise suitably secured on the machine framework. In order to lubricate the bearings for the lower ends of the spindles 40, 40, the power shaft 73 of an oil pump 74 has fixed thereon a gear 74' which meshes with the gear 54 and is driven thereby to operate said pump. Lubricant from the pump 74 is supplied to the bearings at the lower ends of the spindles 40, 40 by a conduit 75 provided with a plurality of branches 76, 76 each of which leads to one of the bearings for the adjacent spindle 40.

After the rose-end mills 18, 18 have been initially engaged with the work in the manner above stated, the machine is started by throwing the clutch lever 70 in the proper direction to connect the pulley 67 with the shaft 52. The work and the mill are thereafter moved relative to each other as above described, so that each mill machines the tapered wall of the adjacent compression recess and undercuts the same in a closed path substantially the same as indicated by the diagrammatic showing of Fig. 6. As here shown, the initial cutting position of the rose-end mill is indicated at 77 and only the advanced cutting portion A—B of the mill is cutting in the shallower part of the recess (Fig. 4). As the mill is not engaged in the recess beyond its maximum transverse or radial section, this portion of the wall is not undercut. The path of the cut, as clearly shown in the drawings, substantially follows the marginal contour of one side of the recess and the undercutting preferably starts at the position 78 of the cutter in the recess. From there on, the undercutting gradually becomes deeper and is deepest at the position 79 and 80 occupied by the cutter at the deeper part of the compression recess. In these positions of the cutter, at least the major portion of the mill performs the undercutting, and as shown in Fig. 5 the undercutting is preferably performed at the positions 79 and 80 by the entire cutting portion A—C of the rose-end mill.

After the recess wall has been cut laterally, as indicated at 79 and 80, the relative movements are reversed and the opposite marginal edge of the recess is machined to the position 81 of the cutter therein. In this portion of the cutting path, it will be noted that the undercutting gradually diminishes from the position 80 of the cutter to the position 81 thereof, the undercutting operation preferably being ended at the last-named position of the mill. It will of course be understood that the entire tapered wall 17 is machined during the cutting operations above described, and that when the wall has been machined from the position 81 of the cutter to the position 77 thereof, the machine may be stopped and the work and the cutters or mills moved relatively to disengage the mills from the work at the shallower parts of the compression recesses.

What is claimed is:

1. The method of machining compression recesses of tapered depth in cylinder heads, which consists in cutting the recess wall along a closed path wherein the cutting begins and ends at the shallower part of the recess, and undercutting the recess wall around the deeper part of the recess while cutting said wall along said path.

2. The method of machining compression recesses of tapered depth in cylinder heads, which consists in cutting the recess wall along a closed path wherein the cutting begins and ends at the shallower part of the recess, and undercutting the recess wall at the sides and end of the deeper part of the recess while cutting said wall along said path.

3. The method of machining compression recesses of tapered depth in cylinder heads, which consists in cutting the recess wall from the shallower part of the recess toward its deeper part, undercutting the portion of the recess wall around the deeper part of the recess, and cutting the remaining portion of said wall from the deeper part of the recess to the point in the shallower part thereof at which the cutting operation started.

4. The method of machining compression recesses of tapered depth in cylinder heads, which consists in cutting the recess wall along one side of the recess from its shallower part toward its deeper part, undercutting the recess wall around the deeper part of the recess, and cutting the recess wall along the opposite side of the recess from its deeper part to its shallower part.

5. The method of machining compression recesses of tapered depth in cylinder heads, which consists in machining a portion of the recess wall from the shallower part of the recess toward its deeper part, machining and undercutting the portion of the recess wall around the deeper part of the recess, and machining the remaining portion of the wall from the deeper part of the recess to the point in its shallower part where the machining operation started.

6. The method of machining compression recesses of tapered depth in cylinder heads, which consists in cutting the recess wall from the shallower part of the recess toward the deeper part thereof, undercutting the recess wall at the end and sides of said deeper part of the recess, and cutting the recess wall from the deeper part of the recess to the shallower part thereof.

7. The method of machining compression recesses of tapered depth in cylinder heads, which consists in machining the recess wall from the shallower part of the recess toward the deeper part thereof, machining and undercutting the recess wall around the deeper part of the recess, and machining the recess wall from the deeper part of the recess to its shallower part in a path similar to but on the opposite side of the recess from that of the first named machining operation.

8. The method of machining compression recesses of tapered depth in cylinder heads, which consists in first engaging a mill with the recess wall in the shallower part of the recess, milling the recess wall toward the deeper part of the recess, milling and undercutting the recess wall around the deeper part of the recess from one side of said recess to its opposite side, and milling the recess wall from the deeper part of the recess to its shallower part in a path similar to but opposite that of the first named milling operation.

9. The method of machining compression recesses of tapered depth in cylinder heads, which consists in cutting into the recess wall at the shallower part of the recess with the advanced cutting portion of a rose-end mill, cutting a portion of the recess wall from the shallower part of the recess toward its deeper part until a major portion of the mill is disposed therein and cuts laterally into said wall, and undercutting the portion of the recess wall around the deeper part of the recess with the major portion of said mill, and cutting the remainder of the recess wall from the deeper part of the recess toward its shallower part with said advanced cutting portion of the mill.

10. The method of machining compression recesses of tapered depth in cylinder heads, which consists in cutting into the recess wall at the shallower part of the recess with the advanced cutting portion of a rose-end mill, cutting a portion of the recess wall from the shallower part of the recess toward its deeper part until the mill cuts laterally into the wall and is entirely disposed in said deeper part, undercutting the portion of the recess wall around the deeper part of the recess until the major portion of the mill passes out of said recess, and cutting the remainder of the recess wall from the deeper part of the recess to its shallower part with the advanced cutting portion of the mill.

11. The method of machining compression recesses of tapered depth in cylinder heads, which consists in cutting into the recess wall at the shallower part of the recess with the advanced cutting portion of a rose-end mill, cutting the recess wall along one side of the recess until a major portion of the mill is disposed in the deeper part of the recess and cuts laterally into said wall, undercutting the recess wall around the deeper part of the recess with cutting edges of said major portion of the mill that are curved in an axial direction, and cutting the recess wall along the opposite side of the recess from the deeper part thereof to the point in its shallower part where the cutting operation started.

12. The method of machining compression recesses of tapered depth in cylinder heads, which consists in starting the cutting operations at the shallower part of the recess with the advanced cutting portion of a rose-end mill, cutting a portion of the recess wall toward the deeper part of the recess until the major portion of the mill is disposed in the deeper part of the recess and cuts laterally into said wall, undercutting the portion of the recess wall around the deeper part of the recess with cutting edges of said major portion of the mill that are curved in an axial direction, and cutting the remaining portion of the recess wall with the advanced cutting portion along a path similar to but at the opposite side of the recess from that of the first cutting operations.

13. The method of machining compression recesses of tapered depth in cylinder heads, which consists in positioning and moving the cylinder head and a rose-end mill relatively so that said mill machines the recess wall from the shallower part of the recess toward the deeper part thereof, then machines and undercuts the recess wall around the the deeper part of the recess, and finally machines the recess wall from the deeper part of the recess to its shallower part in a path similar to but at one side of that of the first named machining operation.

14. The method of machining compression recesses of tapered depth in cylinder heads, which consists in positioning and moving the cylinder head and a rose-end mill relatively so that said mill machines the metal along a closed path starting and ending at that portion of said path where the completed recess is shallower and undercuts the metal in that portion of said path where the completed recess is deeper.

15. The method of machining compression recesses of tapered depth in cylinder heads, which consists in milling a portion of the recess wall from the shallower part of the recess toward its deeper part, milling the portion of the recess wall at said deeper part laterally thereof and undercutting said wall to a depth gradually increasing from one side of the recess to an intermediate point therein and gradually decreasing from said point to the opposite side of said recess, and milling the remainder of the recess wall from the deeper part of the recess to its shallower part.

16. The method of machining compression recesses of tapered depth in cylinder heads, which consists in cutting the metal along a closed path wherein the cutting begins and ends at a point where the completed recess is shallower, and undercutting the metal in that portion of said path where the completed recess is deeper.

17. The method of machining compression recesses of tapered depth in cylinder heads, which consists in cutting the metal along a path from a point where the completed recess is shallower to a point where the completed recess is deeper, then undercutting the metal along a path extending around that part of the completed recess which is deeper, and finally cutting the metal along a path opposite the first named path, from a point in the completed recess which is deeper to a point where the completed recess is shallower.

In testimony whereof I have signed this specification.

CARL F. JEFFRIES.